United States Patent [19]

Kinoshita et al.

[11] 4,369,132

[45] Jan. 18, 1983

[54] EXHAUST GAS PURIFYING CATALYST

[75] Inventors: Hiroo Kinoshita; Yoshihiro Suzuki, both of Toyota; Shoji Saruhashi; Masayasu Sato, both of Shizuoka, all of Japan

[73] Assignees: Toyota Jidosha Kogyo Kabushiki Kaisha, Aichi; Cataler Industrial Co., Ltd., Shizuoka, both of Japan

[21] Appl. No.: 214,322

[22] Filed: Dec. 8, 1980

[30] Foreign Application Priority Data

Jan. 18, 1980 [JP] Japan .................................. 55-4130

[51] Int. Cl.$^3$ ............................................. B01J 23/58
[52] U.S. Cl. ................................ 252/466 PT; 252/440; 252/455 R; 252/460; 252/462; 252/474; 423/213.5
[58] Field of Search ........... 252/462, 474, 440, 455 R, 252/460, 466 PT; 423/213.5

[56] References Cited

U.S. PATENT DOCUMENTS

| | | | |
|---|---|---|---|
| 3,257,163 | 6/1966 | Stiles | 423/213.5 |
| 3,784,675 | 1/1974 | Kobylinski et al. | 423/213.5 |
| 3,842,159 | 10/1974 | Niebylski et al. | 252/474 X |
| 4,001,143 | 1/1977 | McCann | 252/462 |
| 4,056,489 | 11/1977 | Hindin et al. | 252/462 |
| 4,171,288 | 10/1979 | Keith et al. | 252/462 |
| 4,239,656 | 12/1980 | Fujitani et al. | 252/462 |

FOREIGN PATENT DOCUMENTS 1219282  1/1971  United Kingdom ................ 252/462

*Primary Examiner*—W. J. Shine
*Attorney, Agent, or Firm*—Stevens, Davis, Miller & Mosher

[57] ABSTRACT

Exhaust gas purifying catalyst characterized in that a carrier carries as the catalytic elements, a Pt-family element or elements containing over 50 weight % of Pt and an alkaline metal in proportions of 0.001~1 mole per 1 kg of catalyst; or the carrier carries Ce additionally.

14 Claims, 2 Drawing Figures

EXHAUST GAS PURIFYING CATALYST

BACKGROUND OF THE INVENTION

(1) Field of the Invention

The present invention relates to a catalyst useful for purifying the harmful elements in the exhaust gas such as nitrogen oxide ($NO_x$), carbon monoxide (CO) and hydrocarbon (HC), particularly one useful for purifying the harmful elements in the auto emission gas.

(2) Prior Art

The catalyst employed for purifying the exhaust gases emitted from internal combustion engines like the automobile has to function under specific conditions in which the factors largely affecting the velocity of chemical reaction such as the volume or concentration of the reactants, or working temperature cannot be stabilized; and accordingly it is required to exhibit a high catalytic activity over a very wide range of temperatures.

As such an exhaust gas purifying catalyst, a catalyst constituted of a specific catalytic element carried on a carrier has been known. For the purpose of eliminating the major harmful elements in the auto exhaust gas, i.e., CO, HC and $NO_x$ a Pd-catalyst, a Pt-catalyst, a Pd-Pt binary catalyst and a Pt-Rh binary catalyst have been widely in use.

Among the four items mentioned above, except for the catalyst constituted of Pd only or constituted of Pt-Pd with Pd as main element, the catalyst mainly constituted of Pt as catalytic element shows an excellent purifying performance, but its performance is poor in the range of low exhaust gas temperatures such as at the time of engine start or idling.

The present inventors have improved the purifying performance in the low temperature range of the catalyst mainly constituted of Pt as catalytic element and succeeded in realizing an exhaust gas purifying catalyst exhibiting an excellent performance over a wide range of temperatures.

SUMMARY OF THE INVENTION

The primary object of the present invention is to provide a three-way exhaust gas purifying catalyst mainly composed of Pt with alkali metal, which excels in exhaust gas purifying performance at low temperatures.

Another object of the present invention is to provide a three-way exhaust gas purifying catalyst mainly composed of Pt with alkali metal and cerium, which excels in exhaust gas purification at low temperatures.

Other objects and many of the attendant advantages of this invention will be readily appreciated as the same becomes better understood by reference to the following detailed description when considered in connection with the accompanying drawings.

DETAILED DESCRIPTION OF THE INVENTION

Figure 1:
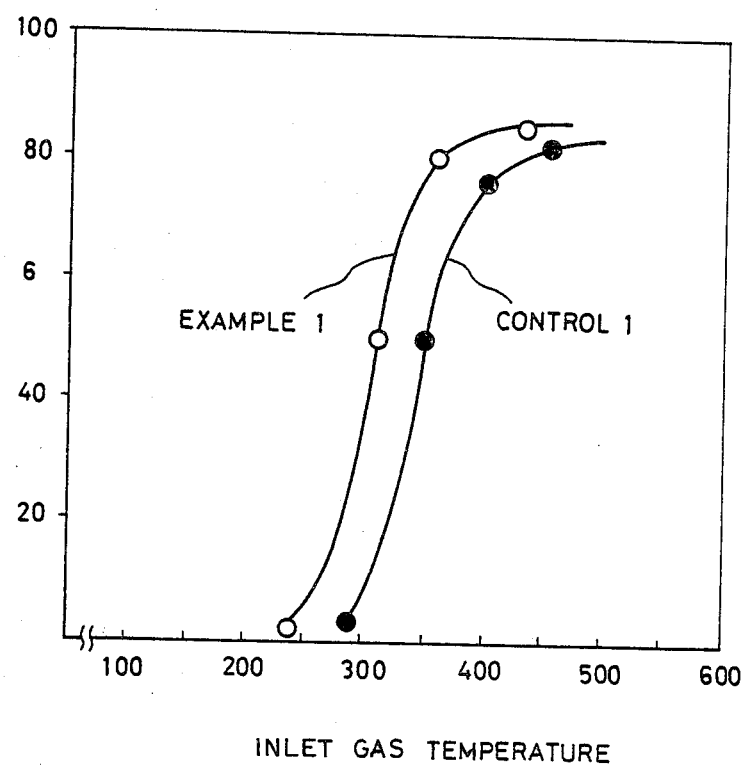
FIG. 1 is a diagram illustrating the relation of the inlet gas temperature vs. HC-purified rate in Example 1 and Control 1.

The present invention relates to an exhaust gas purifying catalyst characterized in that a platinum-family element or elements with over 50 weight % of Pt and an alkali metal such as Li, Na, K, Rb or Cs are carried onto its carrier; or additionally cerium is carried on it. In the present invention, the drawback of an exhaust gas, particularly onto exhaust gas, purifying catalyst mainly composed of Pt (Pt is contained at more than 50 weight % of the amount of the Pt-family metal contained) of poor purifying performance at low temperatures is liquidated by addition with alkali metal such as Li, Na, K, Rb or Cs; and, if necessary, further addition with cerium, thereby vastly improving the exhaust gas purifying performance at low temperatures. Cerium, which comes in different modes such as $CeO_2$ or $Ce_2O_3$, has an effect of facilitating the oxygen exchange on the carrier surface and promoting the simultaneous removal of CO, HC and $NO_x$.

According to the present invention, the carried amount of alkali metal is 0.001~1 mol, preferably 0.01~0.5 mol, per 1 kg of the catalyst. If the carried amount of alkali metal is less than this range, the purifying performance at low temperatures will not be satisfactorily improved; but even if the carried amount is more than that range, the low temperature purifying performance of the catalyst will not be improved any more.

Cerium can be added singly or as an oxide, depending on the need; the adequate addition of cerium will be 0.01~15 weight % of the catalyst.

The adequate amount of Pt to be carried on the carrier is:

(1) in the case of Pt singly carried, 0.01~2 weight %, preferably 0.03~0.5 weight %; (2) in the case of Pt-Pd system, the total amount carried of Pt and Pd is 0.01~2 weight %, preferably 0.03~0.5 weight %; (3) in the case of Pt-Rh system, the total amount carried of Pt and Rh is 0.01~2 weight %, preferably 0.03~0.5 weight %; and (4) in the case of Pt-Pd-Rh system, the total amount carried of Pt, Pd and Rh is 0.01~2 weight %, preferably 0.03~0.5 weight %. When the carried amount of Pt or its family is less than the above-mentioned range, the catalytic activity will not fully assert itself; however, it will never be further improved remarkably, even if the carried amount is increased over the above-mentioned range. Thus the above-mentioned range is found adequate.

When more than two kinds of elements in the platinum family are employed, Pt/Pd weight ratio should be 1/0.01~1/0.99, preferably 1/0.1~1/0.5; Pt/Rh weight ratio should be 1/.0.01~1/0.99, preferably 1/0.02~1/0.5; and Pt:Pd:Rh weight ratio should be 1:0.01:0.01~1:0.99:0.99, preferably 1:0.1:0.02~1:0.5:0.5. In the above ranges, addition with alkali metal will surely improve the exhaust gas purifying performance of the catalyst at low temperatures.

The catalyst according to the present invention can be produced by an appropriate process in the prior art in which a catalytic element is carried by a carrier. A process of impregnating and/or depositing the carrier with a liquid in which compounds containing the catalytic elements such as an alkali metal and Pt, Pd and Rh are dissolved and/or suspended and then drying it at 300°~800° C., preferably firing at 400°~600° C. is found recommendable with respect to the durability and performance of the catalyst thus obtained. Pt, Pd, Rh and alkali metal may be carried onto the carrier at the same time or separately. Or at first the platinum family elements can be carried, followed by the alkali metal. Thus there is no definite order of carrying the catalytic elements on the carrier.

To dissolve and/or suspend the compounds containing the catalytic elements, organic or inorganic solvents such as water, nitric acid, hydrochloric acid, formalin, alcohol, acetic acid can be selectively employed; particularly, nitric acid or hydrochloric acid is preferable. It is also possible, as commonly practiced, to prepare the catalyst through a reducing treatment with hydrogen, formalin or hydrazine.

For preparation of the catalyst according to the present invention, the compounds available which contain the catalytic elements include: platinum chloride, chloroplatinic acid, palladium chloride, palladium nitrate, rhodium chloride, rhodium nitrate, rhodium sulfate. As for the alkali metal, its nitrate or carbonate is preferable. Other compounds available include: complex compounds of Pt, complex compounds of Pd, complex compounds of Rh and hydroxides of alkali metal.

There is no specific restriction about the carrier to be used for the catalyst according to the present invention. Things known in the prior art are available such as: cordierite, zircon, mullite, alumina, silica, alumina-silica, titania, magnesia, barium sulfate, etc. The shape of the carrier is not restricted; it can be a sphere, an ellipse, a cylinder, a honeycomb, a rod, a helix or a net. The size of the carrier can be freely selected to suit the working conditions. Especially the carrier for the auto exhaust gas purifying catalyst is desirably a commonly used alumina carrier in granular (spherical or elliptical) form or a cordierite honeycomb carrier coated with alumina.

The catalyst thus prepared according to the present invention is useful for purification of harmful elements ($NO_x$, HC, CO) in various industrial waste gases from internal combustion engines, boilers, heating furnaces, incinerators, power plants as well as in the auto exhaust gas; especially, it exhibits an excellent performance when the inlet gas temperature is low.

The present invention is to be described in detail referring to examples and controls. In each example and control, the catalyst was submitted to durability tests for evaluation of its performance after the testing. In Examples 1~4 and Controls 1~3, the catalyst was submitted to durability test 1 and evaluation 1. In Examples 5~12 and Controls 4~6, the catalyst was submitted to durability test 2 and evaluation 2.

Durability Test

In this test, an exhaust gas from 2000 cc engine was passed through a multi-converter charged with 20 cc of catalyst in each case. The test conditions are listed in Table 1.

TABLE 1

| | Test conditions | |
|---|---|---|
| | Durability test 1 | Durability test 2 |
| Engine | 2000 cc 6-cylinder | 2000 cc 6-cylinder |
| A/F ratio | 16.0 | 14.6 |
| rpm - boost | 2650 rpm, −360 mmHg | 3200 rpm, −240 mmHg |
| Fuel | Commercial clear gasoline | Commercial clear gasoline |
| Catalyst bed-reaching gas temperature | 600° C. | 600° C. |
| Duration | 30 hours | 30 hours |
| S. V. | 200,000 $Hr^{-1}$ | 480,000 $Hr^{-1}$ |
| Converter Catalyst | 12-multiconverter | 12-multiconverter |

TABLE 1-continued

| | Test conditions | |
|---|---|---|
| | Durability test 1 | Durability test 2 |
| capacity | 20 cc | 20 cc |

A specimen taken from a monolith catalyst for testing [30$\phi$×28 mm long (20 cc)] was measured; and by setting a baffle plate at the exit side of the exhaust gas, the same pressure as the back pressure of pellet catalyst was secured.

Catalyst evaluation

Figure 2:
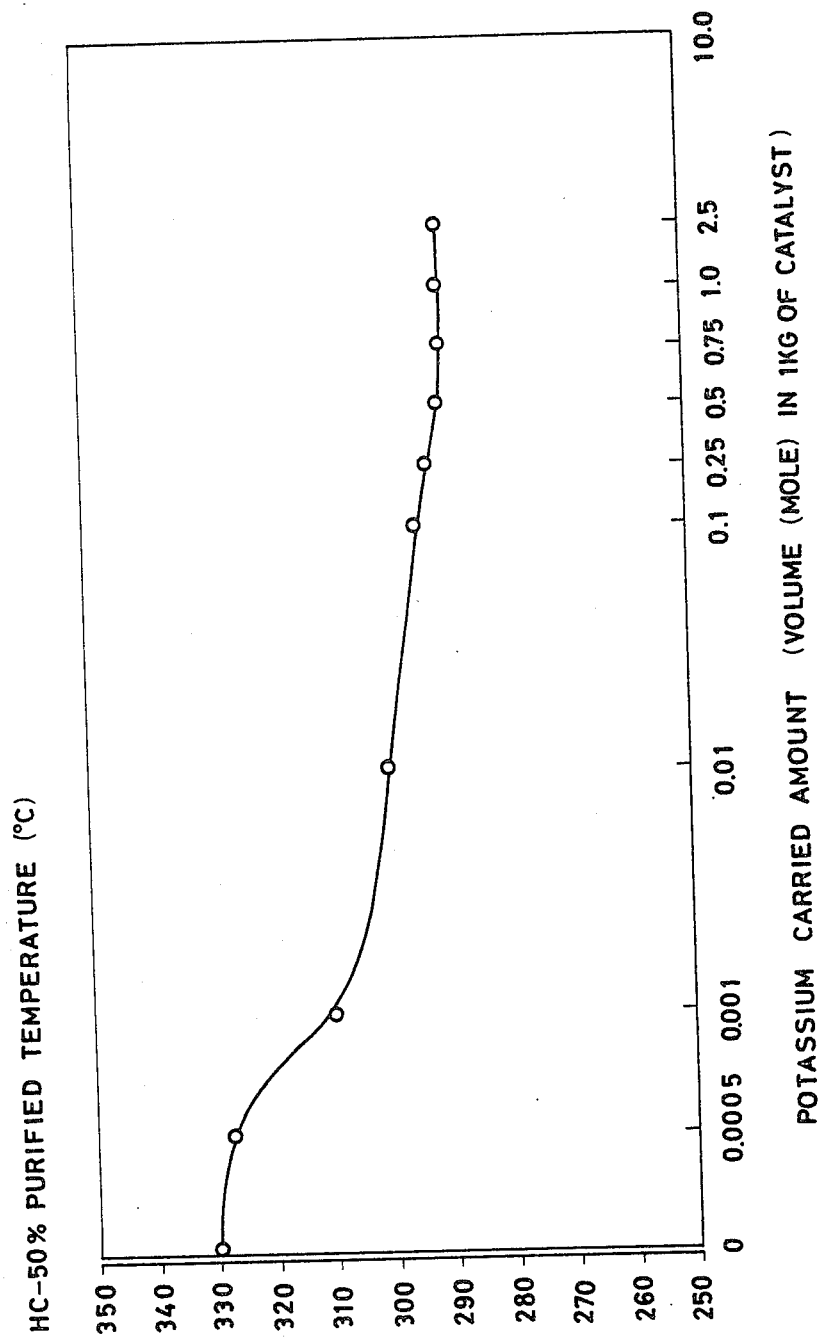
FIG. 2 is a diagram illustrating the relation of HC-50% purified temperature vs. the amount of potassium carried in Example 12.

The catalyst, 20 cc, was charged into a quartz glass reaction tube with its inner diameter of 30 mm$\phi$. A model gas listed in Table 2 was sent in at a spatial velocity of 30,000 $Hr^{-1}$ and, with the gas temperature at the entrance to the catalyst bed set at 100° C.~500° C., the purified rates of HC, CO and $NO_x$ were measured. The results were indicated in terms of the purification start temperature and the 50% purified temperature, Table 4 summarizing the data on the catalysts in Examples 1~4 and Controls 1~3 and Table 5 summarizing the data on the catalysts in Examples 5~11 and Controls 4~6. FIG. 1 illustrates the relation of the inlet gas temperature vs. HC purified rate in Example 1 and Control 1. FIG. 2 illustrates the relation of HC 50% purified temperature vs. the amount of potassium carried in Example 12.

TABLE 2

| | Composition of model gas | |
|---|---|---|
| | Evaluation 1 | Evaluation 2 |
| NO | 0 | 560 ppm |
| CO | 2.0% | 0.65% |
| $H_2$ | 0 | 0.2% |
| $C_3H_6$ | 500 ppm | 300 ppm |
| $O_2$ | 2% | 0.53% |
| $CO_2$ | 10% | 10% |
| $H_2O$ | 10% | 10% |
| $N_2$ | balance | balance |

EXAMPLE 1

350 ml of Chloroplatic acid aqueous solution containing 1 g of Pt was sprayed on 1 l of active alumina carrier ($\gamma$-alumina; about 3 mm in average particle size; bulk density 0.7 g/cc, specific surface area 100 m²/g); and after drying at 110° C., the carrier was fired for 1 hour at 500° C. in the atmosphere. Then 350 ml of an aqueous solution of potassium nitrate containing 0.1 mol of potassium was sprayed on the obtained spherical alumina carrying Pt. After drying at 110° C., the product was fired for 1 hour at 500° C. in the atmosphere, yielding a catalyst with Pt and K carried on the spherical alumina. The carried volumes of the catalytic elements are listed in Table 4. The results of catalyst evaluation are summarized in Table 4 and FIG. 1.

EXAMPLE 2

350 ml of an aqueous solution of chloroplatinic acid (containing 1 g of Pt) and potassium nitrate (containing 0.1 mol of K) was sprayed on 1 l of the same active alumina carrier as employed in Example 1. After drying at 110° C., the product was fired for 1 hour at 500° C. in the atmosphere, yielding a catalyst with Pt and K carried on the spherical alumina. The carried volumes of the catalytic elements and the results of catalyst evaluation are summarized in Table 4.

EXAMPLE 3

1 l of Honeycomb carrier coated with active alumina (main component: cordierite; bulk density 0.6 g/cc; cell number 300 cells/in$^2$; cylinder 130 dia.×76 mm long) was immersed for 30 minutes in 2 l of an aqueous solution of chloroplatinic acid equivalent to 1.25 g of Pt, thereby causing Pt to be carried. After drying at 110° C., the product was fired for 1 hour at 500° C. in the atmosphere. Then, the honeycomb thus carrying Pt was immersed for 1 minute in 2 l of an aqueous solution of potassium carbonate containing 1 mol of K, thereby causing K to be carried. The product was dried at 110° C. and fired for 1 hour at 500° C. in the atmosphere, thereby yielding a catalyst with Pt and K carrid in the honeycomb. The carried volumes of catalytic elements and the results of catalyst evaluation are summarized in Table 4. For durability test and catalyst evaluation, a monolith catalyst [30 mm dia.×28 mm long, (20 cc)] was cut to a specimen.

EXAMPLE 4

350 ml of an aqueous solution containing chloroplatinic acid equivalent to 0.8 g of Pt and palladium chloride equivalent to 0.2 g of Pd was sprayed on 1 l of the same alumina carrier as used in Example 1. The product was dried at 110° C. and fired for 1 hour at 500° C. in the atmosphere. Then, 350 ml of an aqueous solution of potassium nitrate containing 0.1 mol of K was sprayed on the spherical alumina thus carrying Pt and Pd. The product was dried at 110° C. and fired for 1 hour at 500° C. in the atmosphere, yielding a catalyst with Pt, Pd and K carried on the spherical alumina. The carried volumes of catalytic elements and the results of catalyst evaluation are summarized in Table 4.

EXAMPLE 5

350 ml of an aqueous solution containing chloroplatinic acid equivalent to 0.9 g of Pt and rhodium chloride equivalent to 0.1 g of Rh was sprayed on 1 l of the same alumina carrier as used in Example 1. The product was dried at 110° C. and fired for 1 hour at 500° C. in the atmosphere. Then 350 ml of an aqueous solution of potassium nitrate containing 0.1 mol of K was sprayed on the obtained spherical alumina carrying Pt and Rh. The product was dried at 110° C. and fired for 1 hour at 500° C. in the atmosphere, yielding a catalyst with Pt, Rh and K carried on the spherical alumina. The carried volumes of catalytic elements and the results of catalyst evaluation are summarized in Table 5.

EXAMPLE 6

350 ml of an aqueous solution containing chloroplatinic acid equivalent to 0.7 g of Pt, palladium chloride equivalent to 0.2 g of Pd and rhodium chloride equivalent to 0.1 g of Rh was sprayed on 1 l of the same alumina carrier as used in Example 1. The product was dried at 110° C. and fired for 1 hour at 500° C. in the atmosphere. Then 350 ml of an aqueous solution of potassium carbonate containing 0.1 mol of K was sprayed on the product, which was then dried at 110° C. and fired for 1 hour at 500° C. in the atmosphere, thereby producing a catalyst with Pt, Pd, Rh and K carried on the spherical alumina. The carried volumes of catalytic elements and the results of catalyst evaluation are summarized in Table 5.

EXAMPLE 7

350 ml of an aqueous solution of cerium nitrate containing 0.2 mol of Ce was sprayed on 1 l of the same alumina carrier as used in Example 1. The product was dried at 110° C. and fired for 1 hour at 500° C. in the atmosphere. Next, the spherical alumina now carrying Ce was made to carry Pt, Rh and K in the same way as in Example 5, thereby yielding a catalyst. The carried volumes of catalytic elements and the results of catalyst evaluation are summarized in Table 5.

EXAMPLE 8

350 ml of an aqueous solution of cerium nitrate containing 0.2 mol of Ce was sprayed on 1 l of the same alumina carrier as used in Example 1. The product was dried at 110° C. and fired for 1 hour at 500° C. in the atmosphere. Then 350 ml of an aqueous solution containing chloroplatinic acid equivalent to 0.9 of Pt, and rhodium chloride equivalent to 0.1 g of Rh was sprayed on the obtained spherical alumina now carrying Ce. The product was dried at 110° C. and fired for 1 hour at 500° C. in the atmosphere. Next, 350 ml of an aqueous solution of lithium nitrate containing 0.1 mol of Li was sprayed on the spherical alumina now carrying Ce, Pt and Rh. The product was dried at 110° C. and fired for 1 hour at 500° C. in the atmosphere, thereby yielding a catalyst with Pt, Rh, Ce and Li carried on the spherical alumina. The carried volumes of catalytic elements and the results of catalyst evaluation are summarized in Table 5.

EXAMPLE 9

Using the same alumina carrier as used in Example 1, Pt, Rh and Ce were carried on it in the same way as in Example 8. 350 ml of an aqueous solution of sodium carbonate containing 0.1 mol of sodium was sprayed on the spherical alumina thus obtained. The product was dried at 110° C. and then fired for 1 hour at 500° C. in the atmosphere, thereby producing a catalyst with Pt, Rh, Ce and Na carried on the spherical alumina.

The carried volumes of catalytic elements and the results of catalyst evaluation are summarized in Table 5.

EXAMPLE 10

Using the same alumina carrier as used in Example 1, Pt, Rh and Ce were carried on it in the same way as in Example 8. The spherical alumina thus obtained carrying the three elements was sprayed with 350 ml of an aqueous solution of rubidium carbonate containing 0.1 mol of Rb; dried at 110° C. and fired for 1 hour at 500° C. in the atmosphere, thereby producing a catalyst with Pt, Rh, Ce and Rb carried on the spherical alumina. The carried volume of catalytic elements and the results of catalyst evaluation are summarized in Table 5.

EXAMPLE 11

Using the same alumina carrier as used in Example 1, Pt, Rh and Ce were carried on it in the same way as in Example 8. The spherical alumina thus obtained carrying the three elements was sprayed with 350 ml of an aqueous solution of cesium carbonate containing 0.1 mol of Cs; dried at 110° C. and fired for 1 hour at 500° C. in the atmosphere, thereby producing a catalyst with Pt, Rh Ce and Cs carried on the spherical alumina. The carried volumes of catalytic elements and the results of catalyst evaluation are summarized in Table 5.

EXAMPLE 12

Ce, K, Pt and Rh were successively carried on 1 l of the honeycomb carrier preliminarily coated with active alumina as used in Example 3, thereby producing a catalyst listed in Table 3. These elements were carried by the following process.

First Ce was carried by immersing the honeycomb carrier for 1 minute in an aqueous solution of cerium nitrate (containing 1.1 mol of Ce in 1 l of it), drying it at 110° C. and then firing it for 1 hour at 500° C. in the atmosphere. K was carried by immersing the Ce-carrying honeycomb for 1 minute in an aqueous solution of potassium nitrate (solutions in 1 l of which K was contained in the amount ranging from 0.0017 mol to 0.5 mol were selectively used), drying it at 110° C. and then firing it at 500° C. in the atmosphere. The process was repeated until a desirable carried volume of the element was attained, when the carried volume could not be attained in a single cycle of operation. In the case A (K is not carried), the process of carrying K was omitted.

Pt was carried by immersing the Ce and K-carrying honeycomb for 30 minutes in 2 l of an aqueous solution containing chloroplatinic acid equivalent to 1.25 g of Pt, drying it at 110° C. and then firing it for 1 hour at 500° C. in the atmosphere.

Finally Rh was carried by immersing the Ce, K and Pt-carrying honeycomb for 30 minutes in 2 l of an aqueous solution of rhodium chloride equivalent to 0.125 g of Rh, drying it at 110° C. and then firing it for 1 hour at 500° C. in the atmosphere.

The results of catalyst evaluation are given in terms of HC 50% purified temperature in FIG. 2. For durability test and catalyst evaluation, a monolith catalyst [30 mm dia.×28 mm long, (20 cc)] was cut to a specimen.

TABLE 3

| | Carried volumes reduced as metal weight of catalytic elements | | | |
|---|---|---|---|---|
| | Weight % | | Rare earth metal | Volume (mol) in 1 kg of catalyst Alkali metal |
| Cases | Pt-family element | | Ce | K |
| | Pt | Rh | | |
| A | 0.17 | 0.017 | 4.8 | 0 |
| B | 0.17 | 0.017 | 4.8 | 0.0005 |
| C | 0.17 | 0.017 | 4.8 | 0.001 |
| D | 0.17 | 0.017 | 4.8 | 0.01 |
| E | 0.17 | 0.017 | 4.8 | 0.25 |
| F | 0.17 | 4.8 | 0.5 | |
| G | 0.17 | 0.017 | 4.8 | 0.75 |
| H | 0.17 | 0.017 | 4.8 | 1.0 |
| I | 0.17 | 0.017 | 4.8 | 2.5 |

As seen from FIG. 2, the performance is vastly improved when K is carried in the amount of over 0.001 mol per 1 kg of catalyst; the improvement of performance is not prominent when its content per 1 kg of catalyst is less than 0.001 mol. Even if K-addition is raised to over 1.0 mol per 1 kg of catalyst, further improvement will not be obtained. Thus the adequate volume of K to be carried per 1 kg of catalyst will be 0.001~1.0 mol, preferably 0.01~0.5 mol.

Control 1

Using the active alumina carrier employed in Example 1, Pt was carried in the same way as in Example 1, producing a Pt-carrying catalyst. The difference from Example 1 is that K was not carried. The carried volume of catalytic element is listed in Table 4. The results of catalyst evaluation are summarized in Table 4 and FIG. 1.

Control 2

Using the same honeycomb carrier coated with active alumina as employed in Example 3, a Pt-carrying catalyst was prepared in the same way as in Example 3. The difference from Example 3 is that K was not carried. The carried volume of catalytic element and the results of catalyst evaluation are summarized in Table 4. For durability test and catalyst evaluation, a monolith catalyst [30 mm dia.×28 mm long (20 cc)] was cut to a specimen.

Control 3

Using the same alumina carrier as in Example 1, a Pt and Pd-carrying catalyst was prepared in the same way as in Example 4. The difference from Example 4 is that K was not carried. The carried volumes of catalytic elements and the results of catalyst evaluation are summarized in Table 4.

Control 4

Using the same active alumina carrier as in Example 1, a Pt and Rh-carrying catalyst was prepared in the same way as in Example 5. The difference from Example 5 is that K was not carried. The carried volumes of catalytic elements and the results of catalyst evaluation are summarized in Table 5.

Control 5

Using the same alumina carrier as in Example 1, a Pt, Pd and Rh-carrying catalyst was prepared in the same way as in Example 6. The difference from Example 6 is that K was not carried. The carried volumes of catalytic elements and the results of catalyst evaluation are summarized in Table 5.

Control 6

Using the same active alumina carrier as in Example 1, a Pt, Rh and Ce-carrying catalyst was prepared in the same way as in Example 7. The difference from Example 7 is that K was not carried. The carried volumes of catalytic elements and the results of catalyst evaluation are summarized in Table 5.

TABLE 4

| | Carried volumes of catalytic elements in oxidizing the catalysts and results of catalyst evaluation | | | | |
|---|---|---|---|---|---|
| | Carried volumes reduced as metal weight of catalytic elements | | | Catalyst evaluation (°C.) | |
| | Weight % Pt-family element | | Volume (mol) in 1 kg of catalyst alkali metal | Purification start temp. 50% purified temp. | |
| Cases | Pt | Pd | K | HC | CO |
| Examples 1 | 0.14 | — | 0.14 | 240 310 | 210 280 |

TABLE 4-continued

Carried volumes of catalytic elements in oxidizing the catalysts and results of catalyst evaluation

| | | Carried volumes reduced as metal weight of catalytic elements | | Catalyst evaluation (°C.) [Purification start temp. / 50% purified temp.] | |
|---|---|---|---|---|---|
| | | Weight % Pt-family element | | Volume (mol) in 1 kg of catalyst alkali metal | |
| Cases | | Pt | Pd | K | HC | CO |
| | 2 | 0.14 | — | 0.14 | 245 | 215 |
| | | | | | 315 | 280 |
| | 3 | 0.17 | — | 0.14 | 230 | 200 |
| | | | | | 300 | 270 |
| | 4 | 0.11 | 0.03 | 0.14 | 210 | 180 |
| | | | | | 280 | 250 |
| Controls | 1 | 0.14 | — | — | 290 | 260 |
| | | | | | 355 | 325 |
| | 2 | 0.17 | — | — | 275 | 245 |
| | | | | | 345 | 315 |
| | 3 | 0.11 | 0.33 | — | 255 | 225 |
| | | | | | 325 | 295 |

TABLE 5

Carried volumes of elements in ternary catalyst and results of evaluation

| | | Carried volumes reduced as metal weight of catalytic elements | | | | | | | | | Catalyst evaluation (°C.) [Purification start temp. / 50% purified temp.] | | |
|---|---|---|---|---|---|---|---|---|---|---|---|---|---|
| | | Weight % | | | Rare earth metal | Volume (mol) in 1 kg of catalyst alkali metal | | | | | | | |
| | | Pt-family element | | | | | | | | | | | |
| Cases | | Pt | Pd | Rh | Ce | Li | Na | K | Rb | Cs | HC | CO | NO |
| Examples | 5 | 0.13 | — | 0.01 | — | — | — | 0.14 | — | — | 225 | 195 | 195 |
| | | | | | | | | | | | 300 | 265 | 265 |
| | 6 | 0.10 | 0.03 | 0.01 | — | — | — | 0.14 | — | — | 210 | 180 | 180 |
| | | | | | | | | | | | 280 | 250 | 250 |
| | 7 | 0.13 | — | 0.01 | 4.0 | — | — | 0.14 | — | — | 220 | 190 | 190 |
| | | | | | | | | | | | 295 | 260 | 260 |
| | 8 | 0.13 | — | 0.01 | 4.0 | 0.14 | — | — | — | — | 220 | 190 | 190 |
| | | | | | | | | | | | 295 | 255 | 255 |
| | 9 | 0.13 | — | 0.01 | 4.0 | — | 0.14 | — | — | — | 225 | 190 | 190 |
| | | | | | | | | | | | 300 | 265 | 265 |
| | 10 | 0.13 | — | 0.01 | 4.0 | — | — | — | 0.14 | — | 220 | 190 | 190 |
| | | | | | | | | | | | 295 | 265 | 265 |
| | 11 | 0.13 | — | 0.01 | 4.0 | — | — | — | — | 0.14 | 220 | 190 | 190 |
| | | | | | | | | | | | 300 | 260 | 260 |
| Controls | 4 | 0.13 | — | 0.01 | — | — | — | — | — | — | 270 | 240 | 240 |
| | | | | | | | | | | | 340 | 310 | 310 |
| | 5 | 0.10 | 0.03 | 0.01 | — | — | — | — | — | — | 255 | 225 | 225 |
| | | | | | | | | | | | 330 | 300 | 300 |
| | 6 | 0.13 | — | 0.01 | 4.0 | — | — | — | — | — | 265 | 235 | 235 |
| | | | | | | | | | | | 335 | 305 | 305 |

As described above, the catalyst according to the present invention exhibits an excellent exhaust gas purifying performance even at low temperatures of exhaust gas and it is useful over a wide range of temperatures. Effective not only for purification of auto exhaust gas but also for purification of various industrial waste gases, the present invention is highly significant.

What is claimed is:

1. An exhaust gas purifying catalyst, comprising:
a carrier selected from the group consisting of cordierite, zircon, mullite, alumina, silica, alumina-silica, titania, magnesia and barium sulfate;
catalytic elements carried by said carrier comprising:
about 0.0001 to 1 mole of alkali metal oxide per 1 kg of catalyst; and
a plurality of Pt-family elements selected from the group consisting of Pt-Pd, Pt-Rh and Pt-Pd-Rh, containing over 50 weight % of Pt.

2. An exhaust gas purifying catalyst, comprising:
a carrier comprising an alumina coating;
catalytic elements carried by said carrier comprising:
about 0.0001 to 1 mole of alkali metal oxide per 1 kg of catalyst; and
a plurality of Pt-family elements selected from the group consisting of Pt-Pd, Pt-Rh and Pt-Pd-Rh, containing over 50 weight % of Pt.

3. Exhaust gas purifying catalyst of claim 1 or 2, wherein a cerium oxide is additionally carried.

4. Exhaust gas purifying catalyst of claim 1 or 2, wherein the Pt-family elements carried are in the range of from about 0.01 to 2 weight %.

5. Exhaust gas purifying catalyst of claim 1 or 2, wherein the Pt-family elements carried are in the range of from about 0.03 to 0.5 weight %.

6. Exhaust gas purifying catalyst in any one of claims 4 or 5, wherein Pt-Pd are carried in the weight ratios of from about 1:0.01 to 1:0.99.

7. Exhaust gas purifying catalyst in any one of claims 4 or 5, wherein Pt-Pd are carried in the weight ratios of from about 1:0.1 to 1:0.5.

8. Exhaust gas purifying catalyst in any one of claims 4 or 5, wherein Pt-Rh are carried in the weight ratios of from about 1:0.01 to 1:0.99.

9. Exhaust gas purifying catalyst in any one of claims 4 or 5, wherein Pt-Rh are carried in the weight ratios of from about 1:0.02 to 1:0.5.

10. Exhaust gas purifying catalyst in any one of claims 4 or 5, wherein Pt-Pd-Rh are carried in the weight ratios of from about 1:0.01:0.01 to 1:0.99:0.99.

11. Exhaust gas purifying catalyst in any one of claims 4 or 5, wherein Pt-Pd-Rh are carried in the weight ratios of from about 1:0.1:0.02 to 1:0.5:0.5.

12. Exhaust gas purifying catalyst in any one of claims 1, 2, 3, 4 or 5 wherein the amount of the alkali metal oxide carried is in the range of from about 0.01 to 0.5 mole.

13. An exhaust gas purifying catalyst as claimed in claim 2, wherein said alumina is active alumina.

14. An exhaust gas purifying catalyst as claimed in claim 2, wherein said carrier comprises a substrate selected from the group consisting of cordierite, zircon, mullite, silica, alumina-silica, titania, magnesia and barium sulfate.

* * * * *